US011309612B2

(12) United States Patent
Hoefner (10) Patent No.: US 11,309,612 B2
(45) Date of Patent: *Apr. 19, 2022

(54) SEPARATING DEVICE FOR A BATTERY MODULE, BATTERY MODULE, AND MOTOR VEHICLE

(71) Applicant: AUDI AG, Ingolstadt (DE)

(72) Inventor: Dirk Hoefner, Wellheim (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,204

(22) Filed: Oct. 30, 2020

(65) Prior Publication Data

US 2021/0143384 A1   May 13, 2021

(30) Foreign Application Priority Data

Nov. 12, 2019 (DE) ...................... 10 2019 130 499.7

(51) Int. Cl.
*H01M 50/403* (2021.01)
*H01M 10/6555* (2014.01)
*H01M 50/30* (2021.01)
*H01M 50/411* (2021.01)
*H01M 50/44* (2021.01)

(52) U.S. Cl.
CPC ..... *H01M 50/403* (2021.01); *H01M 10/6555* (2015.04); *H01M 50/30* (2021.01); *H01M 50/44* (2021.01); *H01M 2220/20* (2013.01)

(58) Field of Classification Search
CPC .................................................. H01M 50/403
See application file for complete search history.

(56) References Cited

U.S. PATENT DOCUMENTS

| 2011/0206964 | A1  | 8/2011 | Odumodu et al. |
| 2015/0200429 | A1* | 7/2015 | Lee ...................... H01M 10/613 429/120 |
| 2017/0194615 | A1  | 7/2017 | Subramanian et al. |
| 2018/0175468 | A1* | 6/2018 | Shin .................. H01M 10/6556 |
| 2018/0254443 | A1* | 9/2018 | Liao .................. H01M 10/6557 |
| 2020/0287252 | A1* | 9/2020 | Li ........................ H01M 10/613 |
| 2021/0028517 | A1* | 1/2021 | Choi ................... H01M 10/653 |
| 2021/0257690 | A1* | 8/2021 | Kilhenny ............ H01M 50/124 |

FOREIGN PATENT DOCUMENTS

DE   11 2011 103 338 T5   7/2013
DE   10 2017 111 130 A1   11/2017

OTHER PUBLICATIONS

Examination Report dated Jun. 8, 2020 in corresponding German application No. 10 2019 130 499.7; 10 pages including Machine-generated English-language translation.

* cited by examiner

*Primary Examiner* — Brian R Ohara
(74) *Attorney, Agent, or Firm* — Maier & Maier, PLLC (57) ABSTRACT

A separating device for a battery module. The separating device includes a first separating element and a second separating element, which are arranged congruently with respect to one another and adjacent one another. Furthermore, the first separating element and the second separating element enclose a chamber between them, and the chamber is filled with a flame-retarding and/or insulating fluid.

16 Claims, 6 Drawing Sheets

SEPARATING DEVICE FOR A BATTERY MODULE, BATTERY MODULE, AND MOTOR VEHICLE

FIELD

The disclosure relates to a separating device for a battery module. The separating device comprises a first separating element and a second separating element, which are arranged congruently with respect to one another and adjacent one another. The disclosure also relates to a battery module, which comprises the separating device according to the disclosure, and a motor vehicle having the battery module according to the disclosure.

BACKGROUND

Battery modules with battery cells, particularly lithium-ion cells, heat up during the charging and discharging phase. If this temperature reaches a critical value, this may result in a spontaneous combustion, which can also be characterized as a propagation. In addition, the battery cells expand during the charging and discharging phase, which can also be characterized as swelling. In order to prevent spread of the propagation from one battery cell to the next battery cell or damage due to an expansion of the battery cells, it is known from the general prior art to arrange separating plates, for example made of a ceramic material, between the battery cells. A disadvantage of such separating plates is that the separating plates are usually formed to be very stiff and cannot handle the forces from the expansion of the battery cells during the charging and discharging phase; this can lead to high voltages within the battery module and within the respective battery cells. Furthermore, the separating plates insulate very strongly to the extent that hardly any or no heat can be dissipated via the separating plates.

Such type of separating plate is described, for example, in US 2017/0194615 A1. The separating plate, which can also be characterized as a battery cell separator, contains an upper and a lower surface. A structure extends between the upper surface and the lower surface and contains a first contoured surface on a first side of the structure and a second contoured surface on a second side. The first contoured surface and the second contoured surface converge between the upper surface and a middle of the structure and diverge between the middle and the lower surface. A disadvantage of this separating plate is that it is constructed especially complexly.

In order to dissipate heat from the battery cells via separating plates between the battery cells, it is known from the prior art to arrange separating plates with integrated cooling channels between the battery cells.

Thus, US 2011/0206964 A1 describes, for example, a cooling assembly for a battery assembly. The cooling assembly has a cooling plate, in which a flow channel is integrated. The cooling plate is arranged between the battery cells of the battery assembly in order to transfer heat from the battery cells adjacent the cooling plate to a fluid flowing in the flow channel.

US 2015/0200429 A1 discloses a heat-dissipation unit. The heat-dissipation unit comprises a main structure, which has a fluid channel with a fluid inlet and a fluid outlet. The heat-dissipation unit is arranged between the battery cells of a battery. The fluid channel is designed such that, when a coolant flows through the fluid channel, at least one side wall of the fluid channel is pressed outward by the coolant, expands, and has contact with the surface of the heat-generating battery cell.

One disadvantage of an integrated forming of a cooling channel and/or flow channel within the separating plate is that, in the event of damage to the cooling channel, the coolant exits the cooling channel and can cause further damage within the battery module.

SUMMARY

Thus, the object of the present disclosure is to provide an improved separating device which is constructed, particularly in the design, to be especially simple and robust, can handle external voltages, and simultaneously can reliably curtail or even prevent a propagation from one battery cell to the next or damage.

This object is achieved by means of a separating device, a battery module, as well as a motor vehicle.

The disclosure provides for a separating device for a battery module. The separating device comprises a first separating element and a second separating element, which are arranged congruently with respect to one another and adjacent one another. In other words, the first separating element and the second separating element may be arranged parallel to one another and adjacent one another. In other words, the first separating element and the second separating element can be arranged directly above one another and on top of one another, particularly completely overlapping, in a supportive manner, or coplanar as relates to one another. In particular, the two separating elements are connected, particularly welded, to one another preferably on the edge or along a common outer edge. Preferably, the first separating element and the second separating element are formed equivalently or identically. In other words, the first separating element and the second separating element may have the same geometry and/or dimensions and/or shape. Preferably, the first and the second separating element may have a rectangular shape. Especially preferably, the first separating element and the second separating element in this case are formed in the shape of a plate. In other words, the first separating element and the second separating element may be formed as a plate, particularly as a separating plate.

The disclosure is characterized in that the first separating element and the second separating element enclose a chamber. In other words, a chamber is arranged between the first separating element and the second separating element. In other words, the first separating element and the second separating element are formed such that they surround a chamber or form a chamber between them. The term "chamber" refers particularly to a cavity. Preferably, the chamber is arranged centrally or centrically between the first separating element and the second separating element. In particular, the first separating element and the second separating element extend in a vertical or longitudinal direction and in a width direction, wherein the vertical direction and the width direction span a plane between each other, wherein the chamber is arranged centrally as relates to the plane between the separating elements—first separating element and second separating element. In particular, the chamber is closed. Preferably, the remaining first separating element and the remaining second separating element form an edge or a frame about the chamber, particularly outside of the chamber. The separating device can also be characterized as a membrane due to the multiple layers comprising the first separating element and the second separating element as well as the chamber enclosed therein. The term "membrane" here particularly refers to a thin structure with different properties which have a large surface expansion as compared to the thickness thereof. The membrane particularly has the capacity for separation.

Furthermore, the chamber is filled with a flame-retarding and/or insulating fluid. "Flame-retarding" here particularly means that the fluid has a predetermined fire resistance. The term "insulating" particularly means that the fluid has an insulating effect, particularly a predetermined heat resistance.

The separating device is formed to be multifunctional due to the formation of the chamber between the separating elements and the flame-retarding and/or insulating fluid. On the one hand, external forces acting on the separating device can be handled and compensated for especially well due to the chamber. On the other hand, a cell propagation can be reduced or inhibited, and the resulting fire damage within the battery housing is reduced or even prevented by means of the fluid.

One advantageous embodiment provides that the flame-retarding and/or insulating fluid is formed as a gas or as a liquid. If it is a gas for example, the gas may preferably comprise carbon dioxide or halogen or monoammonium phosphate. Gases are particularly compressible. A spring stiffness of the separating device can be set with the aid of the gas, particularly the type and/or quantity of the gas. The gas can be supplied to the chamber during the manufacturing process of the separating device, for example in a pressure chamber, in which the first separating element and the second separating element are connected to one another. Alternatively, the gas can be supplied to the chamber with an injection needle in that the injection needle penetrates or punctures one of the separating elements in the region of the chamber. If the gas is supplied to the chamber by means of the injection needle, the opening caused by the injection needle can subsequently be closed, particularly welded.

According to an alternative embodiment, it may be provided that the flame-retarding and/or insulating fluid is formed as a liquid or as an additive. For example, the additive may be formed as a powder. Alternatively, the flame-retarding and/or insulating fluid may contain an additive. Furthermore, the flame-retarding and/or insulating fluid may be formed as a phase change material (PCM). A phase change material is particularly a substance or a fluid or a material which releases or absorbs sufficient energy during the phase transition in order to provide useful heat or cooling.

In an advantageous manner, the separating device has a third separating element which is arranged between the first separating element and the second separating element, wherein the third separating element is formed as a fabric board or fiberboard. Especially preferably, an expansion and/or geometry of the third separating element is adapted to an expansion and/or geometry of the first separating element and of the second separating element. In other words, a dimension and/or shape of the third separating element is adapted to a dimension and/or shape of the first separating element and/or of the second separating element. Preferably, the third separating element has a rectangular and/or plate-shaped shape.

Preferably, the third separating element separates the chamber into two chamber halves. Especially preferably, both chamber halves can be filled with the same fluid, particularly a gas or a liquid, or with various fluids.

Due to the gas and/or the liquid and/or the additive and/or the third separating element, cell propagation can be reduced or inhibited, and the resulting fire damage within the battery housing is reduced or even prevented by means of the gas and/or additive and/or liquid and/or the third separating element present in the chamber.

According to an advantageous refinement, it is provided that the separating device has at least one opening, by means of which the flame-retarding and/or insulating fluid can be removed from the chamber, particularly when a temperature and/or a pressure in the chamber reaches a predetermined value. The opening in this case is preferably formed as a burst opening. For example, if the heat input acting on the separating device is too high during a propagation, for example a temperature or a pressure in the separating device reaches a predetermined value, the fluid can thus exit the chamber via the burst opening. For example, the separating device has a channel at a point or in a predetermined region which connects, particularly fluidly, the chamber to an environment or an outer region of the separating device. The channel or the opening can be closed and opened by means of a valve or a closing element as soon a predetermined, critical value is reached within the chamber. The opening provides the advantage that, in the event of a propagation, the flame-retarding and/or insulating fluid can exit the chamber especially easily and rapidly in order to prevent a spread to other battery cells.

A further advantageous embodiment provides that the first separating element and the second separating element have embossments or ribs which correspond to one another for forming the chamber. The term "embossment" particularly refers to a step pressed into the first separating element and the second separating element with a defined shape or groove or recess or notch or impressions. In this case, the embossments preferably have a base surface in the recesses. Preferably, the embossments are formed by stamping or a stamping process. The term "ribbing" refers particularly to ribs. Furthermore, the embossments of the first separating element extend away from the second separating element, and the embossments of the second separating element extend away from the first separating element. In other words, the first separating element and the second separating element have curves due to the embossments, which curves extend away from the opposite separating element. In other words, due to the curves, the first separating element curves away from the second separating element in the region of the chamber, and the second separating element curves away from the first separating element in the region of the chamber. Furthermore, the embossments of the first separating element and of the second separating element are arranged opposite one another. Preferably, the respective embossments have a U shape in the cross-section which extends particularly perpendicular as relates to the plane which is spanned by the vertical and width directions.

The embossments have the advantage that a stiffness of the first separating element and of the second separating element can thereby be increased, whereby the respective separating elements and thus the separating device is designed to be especially robust and stable. The stiffness of the first separating element and of the second separating element can be adjusted as a function of a number of embossments.

In an advantageous manner, the chamber is divided into several chamber regions which are formed by the embossments of the first separating element and of the second separating element. The embossments of the first and of the second separating element can jointly form the chamber and form different chamber regions of the chamber due to the shape thereof. The chamber regions are preferably, particularly fluidly, coupled or connected to each other. External forces acting on the separating device can be handled and compensated for especially well due to the chamber.

One advantageous embodiment provides that the embossments have a rectangular contour. The embossments preferably form a loop or track which has a rectangular shape. Preferably, the chamber has or the chamber regions are a rectangular shape in the cross-section which extends parallel to the plane of the first and of the second separating element, which particularly is spanned between the vertical and the width directions. Alternatively, it may be provided that the embossments have an oval contour or a star-shaped contour or a grid structure. Especially preferably, the chamber regions are formed in the shape of a channel and/or cuboid by means of the embossments. The separating elements—first separating element and second separating element—have especially good stiffness due to the contour of the embossments, whereby the separating device is formed to be especially robust.

The disclosure is based on the knowledge that a pressure profile acting on the separating device can be defined. Correspondingly, one advantageous refinement provides that the contour of the embossments and/or an expansion of the embossments and/or an arrangement of the embossments on the respective separating elements can be adapted to a pressure profile, which particularly acts on the separating device by means of the battery cells. For example, a pressure profile acting on the separating device can be specified by an FM calculation, and the embossments are subsequently formed.

In an advantageous manner, the first separating element and the second separating element are formed from a heat-conducting material, wherein the first separating element and the second separating element are formed from steel as the heat-conducting material. In particular, the first separating element and the second separating element are formed as steel plates. This results in the advantage that the first separating element and the second separating element are formed to be especially robust and can simultaneously absorb and dissipate heat especially well.

The disclosure also includes a battery module which comprises several battery cells, particularly lithium-ion cells, wherein the battery module further has at least one separating device which is arranged between two adjacent battery cells. Preferably, the battery module has several separating devices, wherein each separating device is arranged between two adjacent battery cells. The battery cells in this case can be arranged next to one another in a main extension direction of the battery module. In the region of the chamber, the first separating element rests, at least partially, on a battery cell, particularly on an outer surface of the battery cell which is facing the first separating element, and the second separating element rests, at least partially, on an adjacent battery cell, particularly on an outer surface of the battery cell which is facing the second separating element. In particular, a battery cell and a separating device and a further battery cell are arranged sequentially in the battery module, in the main extension direction of the battery module. If the battery module has several separating devices, a battery cell and a separating device are thus arranged sequentially alternating, particularly in the main extension direction of the battery module. Developing heat can be especially reliably dissipated from the battery cells by means of the direct contact of the battery cells with the separating device. Furthermore, due to the arrangement of the separating device between the battery cells, an application of force due to an expansion of the battery cells can be accommodated and/or compensated for especially well by the separating device.

One advantageous embodiment provides that the battery module has a heat-dissipation device, wherein the battery cells and the separating device are arranged on the heat-dissipation device, particularly in a vertical direction of the battery module. In particular, the vertical direction of the battery module extends perpendicular as relates to the main extension direction. Preferably, the vertical direction of the battery module and/or the separating device extends in the gravitational direction. Preferably, the battery module has a housing with a housing cover and a housing base arranged opposite the housing cover, wherein the battery cells and the separating device are arranged on the housing base. Especially preferably, the heat-dissipation device is arranged between the housing base and the battery cells and the separating device. Heat can be especially reliably dissipated from the battery module by means of the heat-dissipation device.

In an advantageous manner, the heat-dissipation device comprises a thermally conductive paste and/or a cooling element. Preferably, the thermally conductive paste can be arranged between the cooling element and the battery cells and/or the separating device. The cooling element can be formed as a cooling plate. The heat-dissipation device is constructed especially simply as relates to the design by means of the cooling element and/or the thermally conductive paste.

Finally, the disclosure also includes a motor vehicle with the battery module according to the disclosure. The vehicle according to the disclosure is preferably designed as a motor vehicle, particularly as a passenger car or commercial vehicle, or as a passenger bus or motorcycle.

The disclosure also includes refinements of the battery module according to the disclosure and of the motor vehicle according to the disclosure, which have features as they have already been described in association with the refinements of the separating device according to the disclosure. For this reason, the corresponding refinements of the battery module according to the disclosure and of the motor vehicle according to the disclosure are not described again here.

The disclosure also comprises the combinations of the features of the described embodiments.

BRIEF DESCRIPTION OF THE FIGURES

Exemplary embodiments of the disclosure are described in the following. The following is shown.

DETAILED DESCRIPTION

The exemplary embodiments explained in the following refer to preferred embodiments of the disclosure. With the exemplary embodiments, the described components of the embodiments represent individual features to be considered independently of one another, which also further embody the disclosure independently of one another. Thus, the disclosure should also comprise combinations of the features of the embodiments other than those shown. Furthermore, the described embodiments can also be supplemented through further described features of the disclosure.

The same reference numerals refer to equivalent features and functions in the figures.

Figure 1:
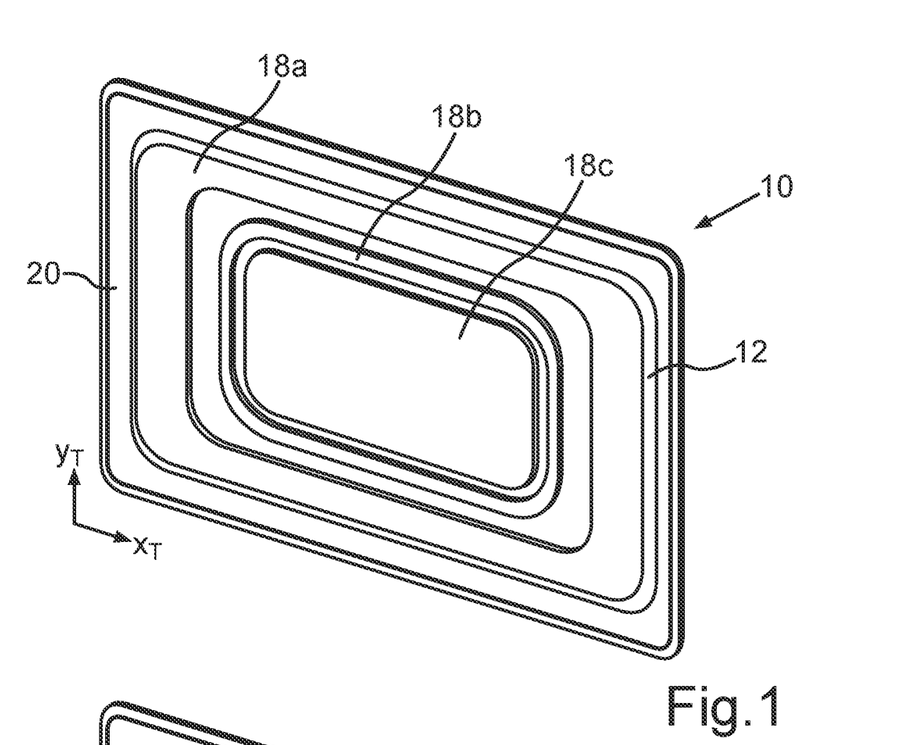
FIG. 1 a schematic representation of a separating device with a first separating element and a second separating element with embossments which have a rectangular contour, in a perspective view.
Figure 2:
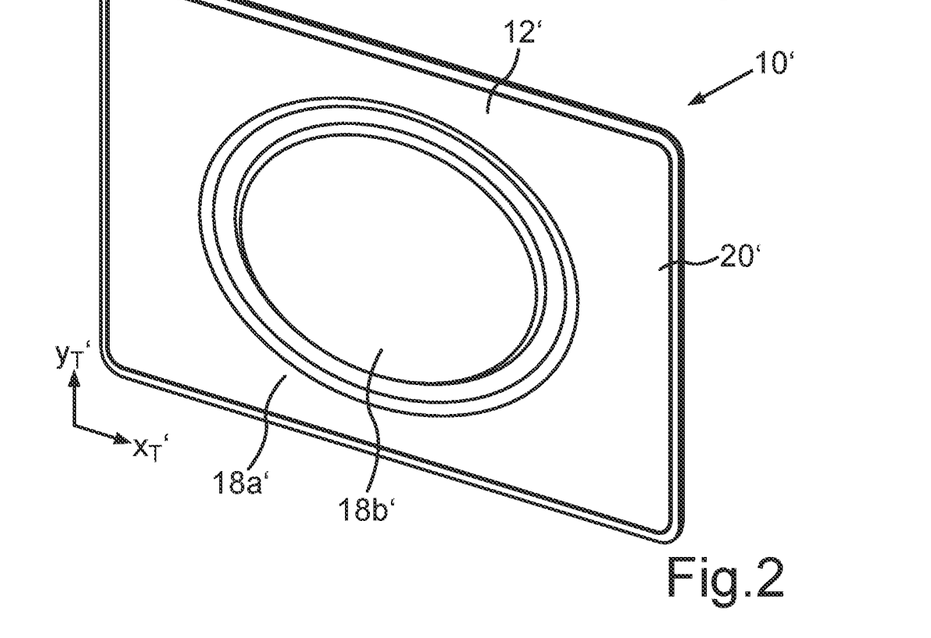
FIG. 2 a schematic representation of a separating device with a first separating element and a second separating element with embossments which have an oval contour, in a perspective view.
Figure 3:
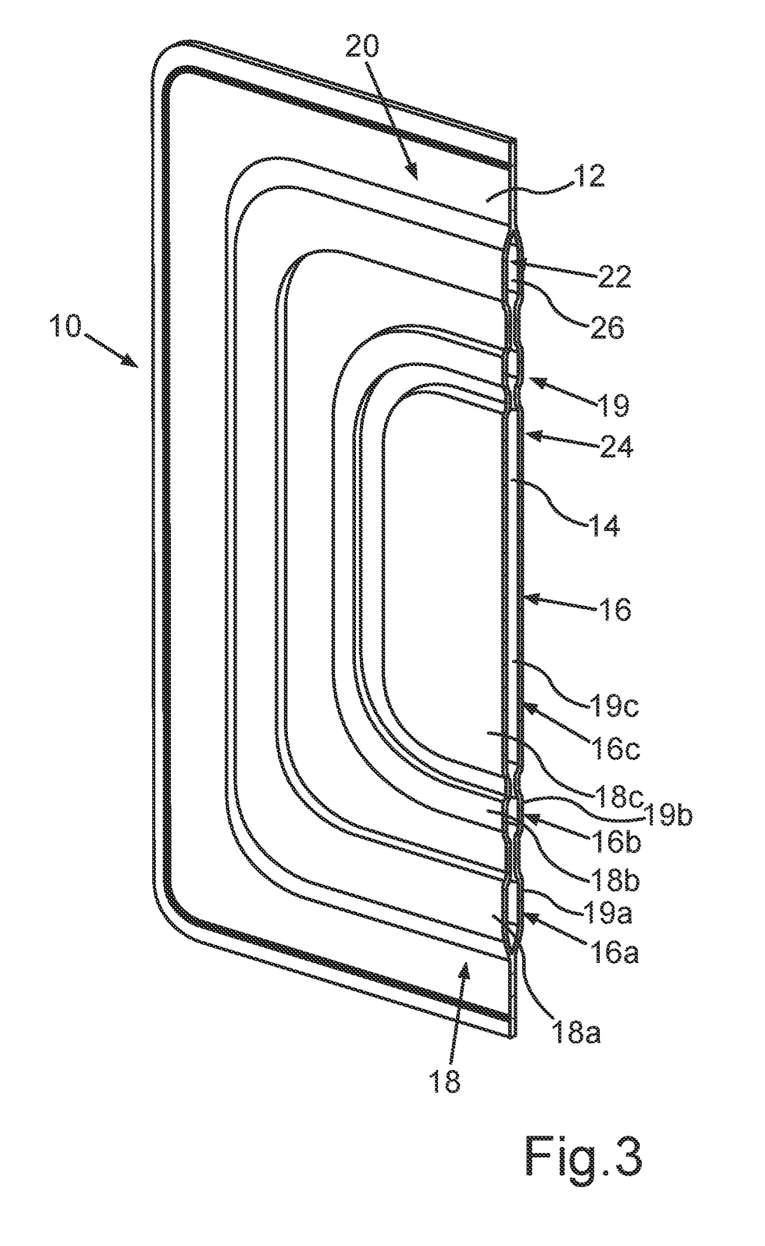
FIG. 3 a schematic representation of one half of the separating device from FIG. 1 in a sectional representation, in a perspective view.

FIG. 1 shows a separating device 10 for a battery module (not shown in FIG. 1) in a perspective view. FIG. 2 shows an alternative design of the separating device 10'. FIG. 3 shows the separating device 10 from FIG. 1 in a sectional view. The structure and the designs of separating device 10 as well as separating device 10' will be explained in greater detail in the following as relates to FIG. 1 to FIG. 3.

The separating device 10 in FIG. 1 and FIG. 3 has a first separating element 12 and a second separating element 14. Because only one side of the separating device 10 is shown in FIG. 1, FIG. 1 shows the first separating element 12. The first separating element 12 and the second separating element 14 are identical or formed to correspond to one another. In particular, the first separating element 12 and the second separating element 14 have the same geometry and/or dimensions. The first separating element 12 and the second separating element 14 have a rectangular shape. In particular, the first separating element 12 and the second separating element 14 are formed as rectangular plates. The first separating element 12 and the second separating element 14 are arranged adjacent one another. In this case, the first separating element 12 and the second separating element 14 are arranged adjacent one another such that they have at least partial contact. Furthermore, the first separating element 12 and the second separating element 14 are arranged congruently with one another, overlap, or cover each other thus completely. The first separating element 12 and the second separating element 14 are connected to one another with positive-locking, particularly welded, on an edge region or on the circumferential edge. For example, the first separating element 12 and the second separating element 14 can be connected by means of laser welding. The connection is indicated by the hatched area and/or line which extends on the edge of the separating device.

Furthermore, the first separating element 12 and the second separating element 14 are formed from a heat-conducting material. For example, the first separating element 12 and the second separating element 14 are formed from steel. Especially preferably, the first separating element 12 and the second separating element 14 are formed as steel sheets which particularly have a predetermined thickness.

As shown in FIG. 3, a chamber 16 is formed between the first separating element 12 and the second separating element 14. The first separating element 12 and the second separating element 14 are arranged at a predetermined distance apart from one another in the region of the chamber 16. In particular, the first separating element 12 and the second separating element 14 do not have contact in the region of the chamber 16. Furthermore, the chamber 16 is divided into individual chamber regions 16a, 16b, 16c. According to the embodiment of the separating device 10 from FIG. 3, the chamber 16 is divided into three chamber regions 16a, 16b, 16c. In this case, the chamber regions 16a, 16b, 16c are connected or coupled to one another, particularly fluidly. The chamber 16 and/or the chamber regions 16a, 16b, 16c are formed by embossments 18 of the first separating element 12 and embossments 19 of the second separating element 14. The embossments 18 of the first separating element 12 and the embossments 19 of the second separating element 14 are identical to one another and are situated in the same position as relates to the plane which is spanned by the width or longitudinal direction $x_T$ and the vertical direction $y_T$. In particular, the embossments 18 of the first separating element 12 and the embossments 19 of the second separating element 14 are arranged opposite one another. In this case, the first chamber region 16a is formed by a first embossment 18a of the first separating element 12 and a first embossment 19a of the second separating element 14, the second chamber region 16b is formed by a second embossment 18b of the first separating element 12 and a second embossment 19b of the second separating element 14, and the third chamber region 16c is formed by a third embossment 18c of the first separating element 12 and a third embossment 19c of the second separating element 14. The embossments 18 of the first separating element 12 and the embossments 19 of the second separating element 14 refer particularly to steps or recesses or impressions or notches or curves. In particular, the embossments 18 of the first separating element 12 and the embossments 19 of the second separating element 14 are formed by stamping or by deep-drawing. The respective embossments 18 of the first separating element 12 and the respective embossments 19 of the second separating element 14 are arranged on the respective separating element 12, 14 at a predetermined distance apart from one another. In particular, the embossments 18, 19 of the respective separating element 12, 14 are arranged offset or spaced apart from one another.

The first separating element 12 has a front side 20 and a back side 22 opposite the front side 20. Furthermore, the second separating element 14 also has a front side 24 and a back side 26 opposite the front side 24. In this case, the back side 22 of the first separating element 12 is facing the back side 26 of the second separating element 14. If the first separating element 12 and the second separating element 14 are arranged adjacent one another, the embossments 18 of the first separating element 12 extend away from the second separating element 14, particularly from the back side 26 of the second separating element 14. Furthermore, the embossments 19 of the second separating element 14 extend away from the first separating element 12, particularly from the back side 22 of the first separating element 12. Due to the embossments 18, 19, the first separating element 12 and the second separating element 14 have protrusions or curves on their front sides 20, 24. Because the first separating element 12 and the second separating element 14 are formed identical to one another, the embossments 18, 19 are situated at the same points.

Outside the embossments 18, 19, the first separating element 12 and the second separating element 14 are arranged closer to one another in the chamber 16 or in the region of the chamber 16 than in the remaining chamber 16.

The first separating element 12 and the second separating element 14 extend in a width or longitudinal direction $x_T$ and in a vertical direction $y_T$. The width or longitudinal direction $x_T$ and the vertical direction $y_T$ span one plane between them. The separating device 10 is shown in a sectional view or halved in FIG. 3. In this case, the cross-section extends perpendicular as relates to the plane which is spanned between the width or longitudinal direction x-r and the vertical direction $y_T$. In this case, the embossments 18 of the first separating element 12 and the embossments 19 of the second separating element 14 have a U shape in the cross-section. Furthermore, the embossments 18 of the first separating element 12 and the embossments 19 of the second separating element 14 have a rectangular contour as relates to the plane which is spanned between the width or longitudinal direction $x_T$ and the vertical direction $y_T$. The first embossment 18a of the first separating element 12 and the first embossment 19a of the second separating element 14 and the second embossment 18b of the first separating element 12 and the second embossment 19b of the second separating element 14 preferably form a loop or track which has a rectangular shape or contour. The first chamber region 16a and the second chamber region 16b are shaped like a channel due to the U shape of the first embossments 18a, 19a and the second embossments 18b, 19b in the cross-section. The first chamber region 16a and the second chamber region 16b extend about the third chamber region 16c. The third chamber region 16c is formed by the third embossment 18c of the first separating element 12, and the third embossment 19c of the second separating element 14 is formed as a cuboid cavity.

The embossments 18, 19 of the first separating element 12 and of the second separating element 14 are arranged centrally on the first separating element 12 and on the second separating element 14. Accordingly, the chamber 16 is arranged centrally or centrically between the first separating element 12 and the second separating element 14. In this case, the remaining first separating element 12 and the remaining second separating element 14 form an edge or a frame outside the chamber 16.

FIG. 2 shows an alternative embodiment of the separating device 10'. In this case, the separating device 10' is formed and/or constructed with a first separating element 12' and a second separating element as relates to the arrangement thereof as well as the dimensions and the manner in which the first separating element 12' and the second separating element are connected, similar to the separating device 10 in the figures FIG. 1 and FIG. 3, which is why reference is made at this juncture to the statements regarding FIG. 1 and FIG. 3. The separating device 10' is also only shown in a front view with the front side 20' of the first separating element in FIG. 2, whereby only the first separating element 12' can be seen.

Separating device 10' and separating device 10 differ in the shape and/or the contour of the embossments 18' of the first separating element 12' and the embossments of the second separating element (not shown in FIG. 2). In this case, the embossments 18' of the first separating element 12 and the embossments of the second separating element have a U shape in the cross-section, the same as with separating device 10. Furthermore, the embossments 18' of the first separating element 12 and the embossments of the second separating element have an oval contour as relates to the plane which is spanned between the width or longitudinal direction $x_T$ and the vertical direction $y_T$. In contrast to the embossments 18 of the first separating element 12 and the embossments 19 of the second separating element 14, the first separating element 12' and the second separating element each have two embossments—a first embossment 18a' of the first separating element and a first embossment of the second separating element and a second embossment 18b' of the first separating element and a second embossment of the second separating element. The first embossment 18a' of the first separating element 12 and the first embossment of the second separating element preferably form a loop or track which has an oval shape or contour. The first chamber region is formed in the shape of a channel due to the U shape of the first embossments of the first separating element 12' and of the second separating element in the cross-section. The first chamber region and thus the first embossments of the first separating element 12' and of the second separating element extend about the second chamber region and thus about the second embossments of the first separating element 12' and of the second separating element. The second chamber region, which is formed by the second embossments of the first separating element 12' and of the second separating element, is formed as a cavity, particularly with an oval contour.

As with the embodiment in FIG. 1, the embossments 18' of the first separating element 12' and of the second separating element are arranged centrally on the first separating element 12' and on the second separating element and/or arranged opposite one another. Accordingly, the chamber is arranged centrally between the first separating element 12' and the second separating element. In this case, the remaining first separating element 12' and the remaining second separating element form an edge or a frame outside the chamber.

Figure 4:
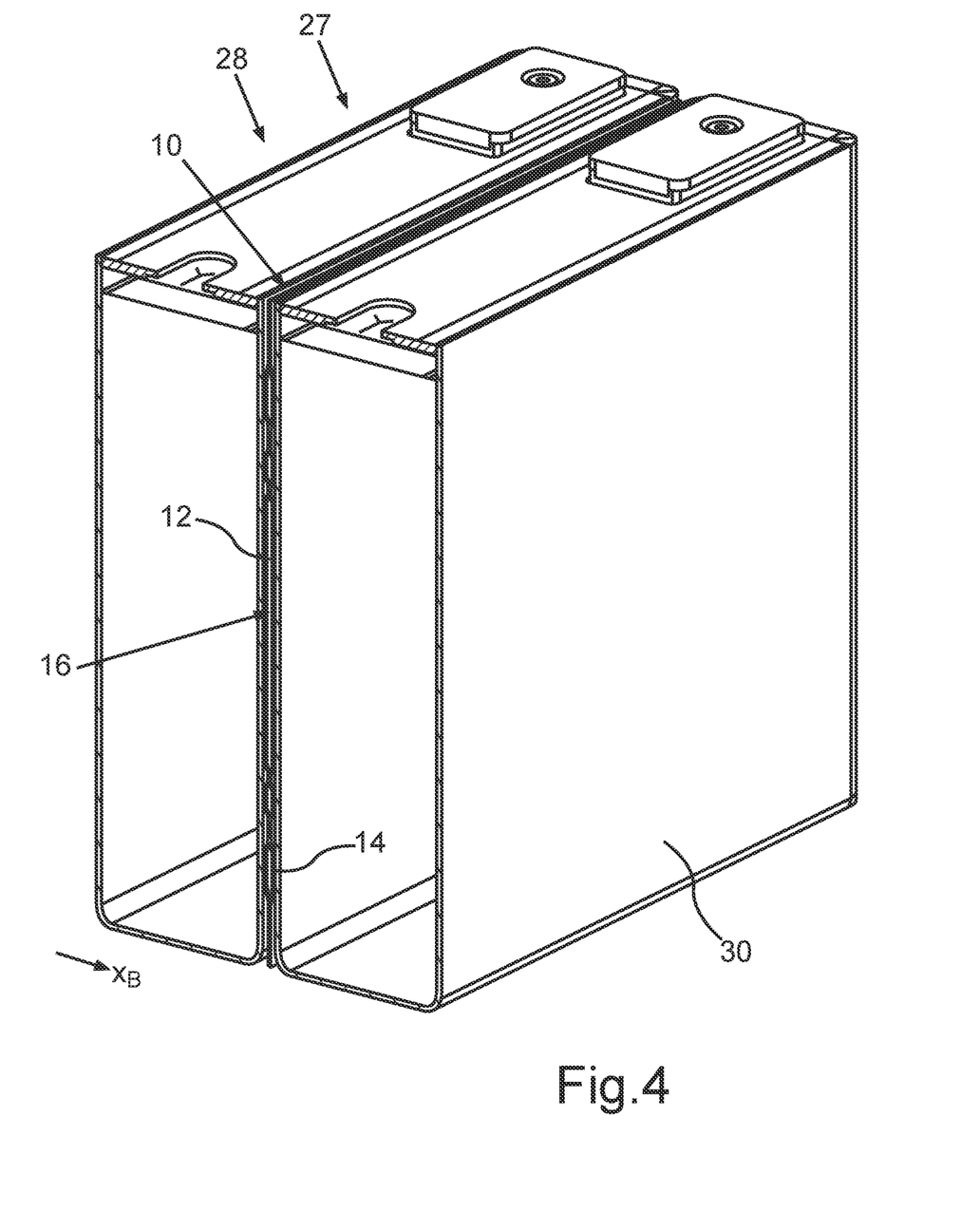
FIG. 4 a schematic representation of two halves of two adjacent battery cells of a battery module with the separating device from FIG. 1 between the adjacent battery cells in a sectional representation, in a perspective view.

FIG. 4 shows two battery cells—a first battery cell 28 and a second battery cell 30—of a battery module 27, in a perspective view. The battery module 27 may have several, preferably more than two, battery cells. The separating device 10 is arranged between the first battery cell 28 and the second battery cell 30. In this case, the first separating element 12 is at least partially adjacent the first battery cell 28, and the second separating element 14 is at least partially, i.e. completely or partially, adjacent the second battery cell 30. The first battery cell 28 and the second battery cell 30 are preferably formed prismatically or have the shape of a prism. Furthermore, an expansion or a dimension of the first separating element 12 and of the second separating element 14 is adapted to an expansion and/or dimension of the adjacent surface of the first battery cell 28 and/or of the second battery cell 30. Thus, the first battery cell 28, the separating device 10, and the second battery cell 30 are arranged sequentially next to one another, in a main extension direction $x_B$ of the battery module 27.

Figure 5:
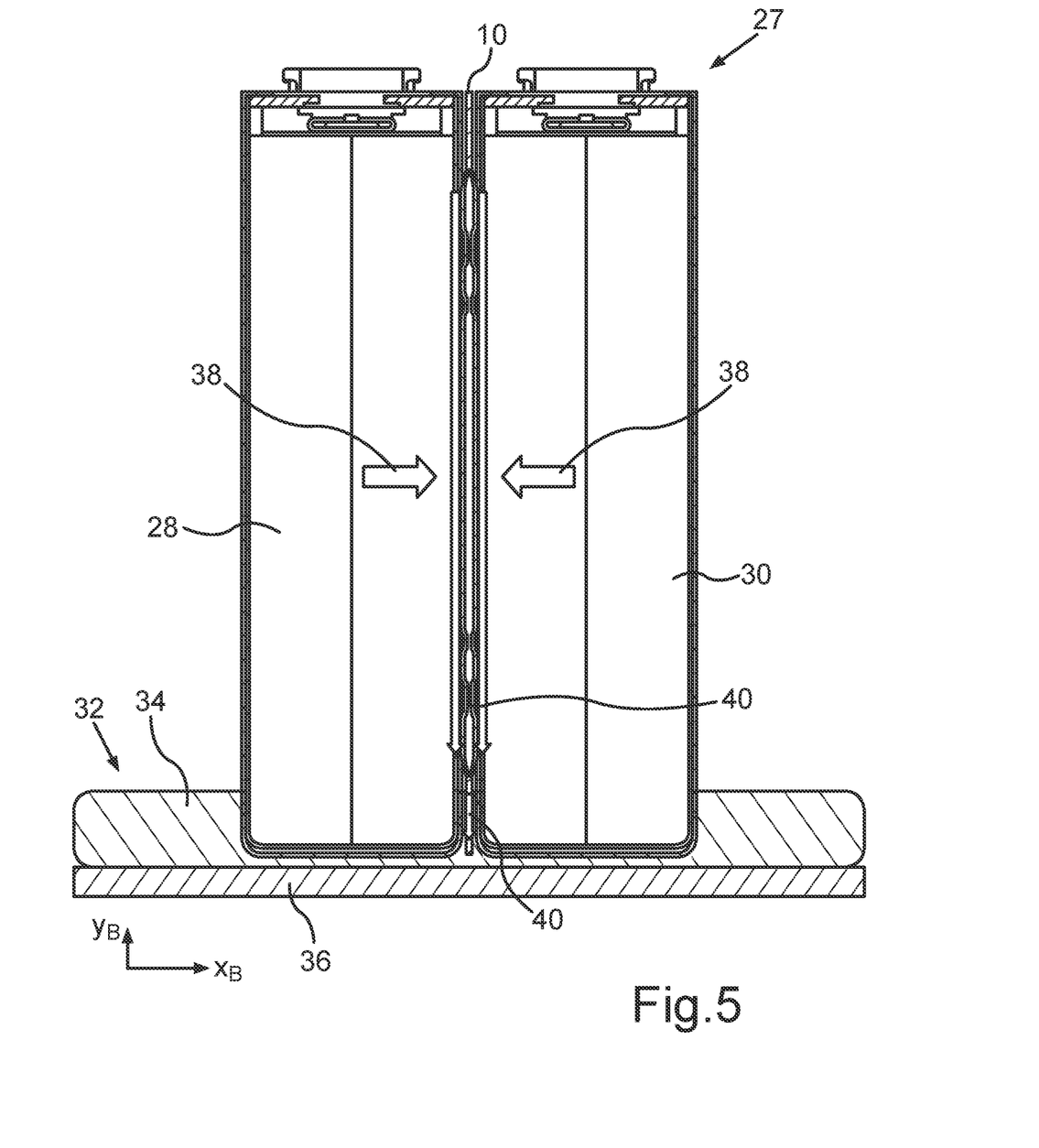
FIG. 5 a schematic representation of the two adjacent battery cells with the separating device from FIG. 4 arranged in between in a front view and a heat-dissipation device for dissipating heat from the battery cells to the heat-dissipation device, via the separating device.
Figure 6:
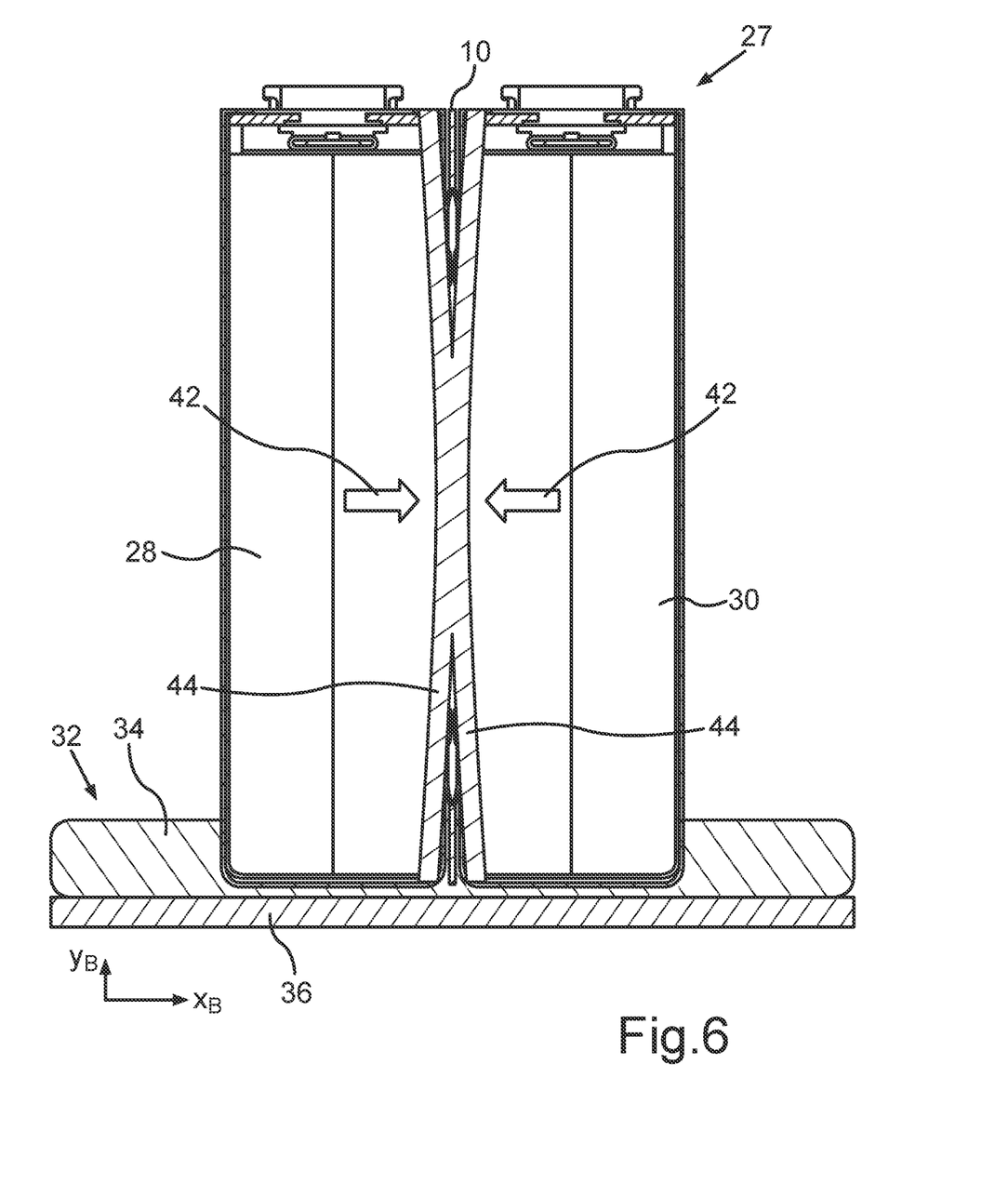
FIG. 6 a schematic representation of the two adjacent battery cells with the separating device from FIG. 4 arranged in between in a front view and an application of force from the battery cells to the separating device.
Figure 7:
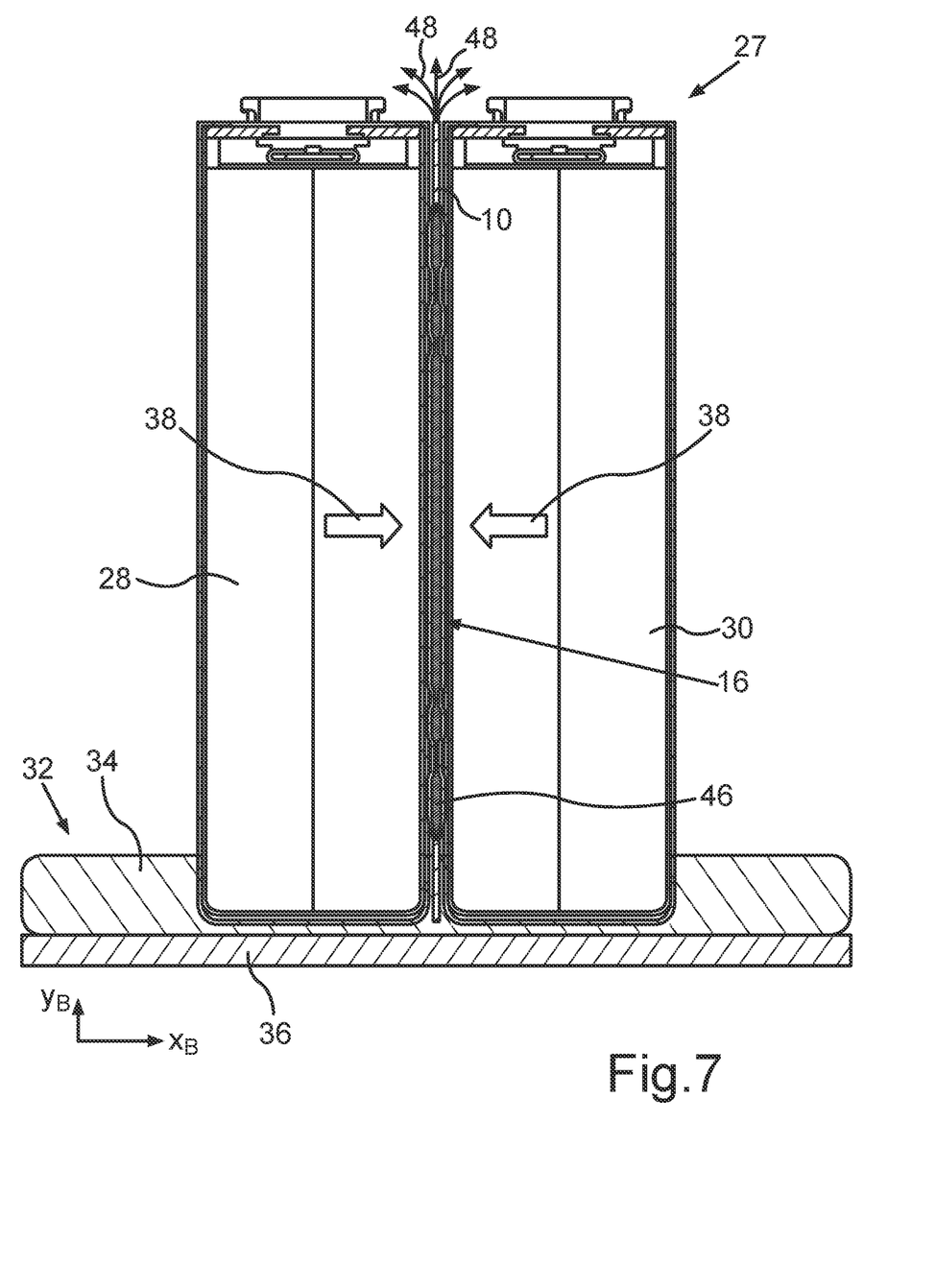
FIG. 7 a schematic representation of the two adjacent battery cells with the separating device from FIG. 4 arranged in between in a front view and a fluid exiting from the separating device via an opening upon an application of heat from the battery cells to the separating device.

FIG. 5, FIG. 6, and FIG. 7 further show a heat-dissipation device 32 of the battery module 27. In this case, the first battery cell 28, the separating device 10, and the second battery cell 30 are arranged on the heat-dissipation devices 32. The heat-dissipation device 32 comprises a thermally conductive paste 34 and a cooling element 36 or a cooling device. The cooling element 36 can be formed, for example, as a cooling plate. In this case, the heat-dissipation device 32 of the battery module 27, particularly the cooling element 36 and the thermally conductive paste 34, and the battery cells—first battery cell 28 and second battery cell 30—are arranged adjacent each other with the separating device 10 in between, in the vertical direction $y_B$ of the battery module 27.

FIG. 5 shows an input of heat of the first battery cell 28 and the second battery cell 30 in or on the separating device 10 as well as the heat dissipation by means of the separating device 10. In the event of a propagation, i.e. an output of heat of the first battery cell 28 and of the second battery cell 30, heat is emitted from the first battery cell 28 and from the second battery cell 30 to the separating device 10, which is indicated by arrow 38. The absorbed heat is dissipated in the direction of the heat-dissipation device 32 by means of the separating device 10, which is indicated by arrow 40.

FIG. 6 shows an application of force of the first battery cell 28 and of the second battery cell 30 onto the separating device 10. In the event of an expansion of the first battery cell 28 and of the second battery cell 30, particularly in the main extension direction $x_B$ of the battery module 27, a force is applied to the separating device 10, which is indicated by arrow 42. The chamber 16 of the separating device 10 is hereby pressed together or compressed and/or the separating device 10 is deformed. The deformation of the separating device 10 is indicated by the two lines 44.

The battery module 27 with the battery cells 28, 30 heats up during the charging and discharging phase. If this temperature reaches a critical value, spontaneous combustion may result. This input of heat from the battery cells is also shown in FIG. 7, as already described regarding FIG. 5.

In order to prevent spontaneous combustion or a spread to further battery cells, the chamber 16 of the separating device 10 is filled with a fluid, which is indicated by the hatched area 46 in FIG. 7. The fluid is preferably formed as a flame-retarding or insulating fluid. "Flame-retarding" here particularly means that the fluid has a predetermined fire resistance. In this case, the fluid may be formed as a gas or as a liquid. If it is a gas for example, the gas may preferably comprise carbon dioxide or halogen or monoammonium phosphate.

If the input of heat to the separating device 10 or within the battery cells 28, 30 or within the battery module 27 is too high, for example a temperature or a pressure in the separating device 10 or in the chamber 16 of the separating device 10 or a temperature of the battery cells or of the battery module 27 reaches a predetermined value, the fluid can exit the chamber 16, as is indicated by arrow 48. To this end, the separating device 10 may have an opening or an outlet. The opening in this case is preferably formed as a burst opening. For example, the separating device 10 has a channel, on a side or region facing away from particularly the heat transfer unit 32, which connects, particularly fluidly, the chamber 16 to an environment or an outer region of the separating device 10. The channel or the opening can be closed and opened by means of a valve or a closing element as soon a predetermined, critical value is reached within the chamber 16 or the battery cells or the battery module 27.

As a whole, the examples show how a membrane separating plate can be provided by the disclosure. Cell propagation should be prevented, and "swelling forces" can simultaneously be absorbed, and heat from the battery cell can be dissipated by a separating plate—primarily made of steel. This is achieved by means of a separating plate which is a membrane composed of at least 2 layers. The membrane can be filled with various gases, whereby at least two properties, a spring stiffness and an insulation quality, can be set. The gases or fluids can be flame-retarding—for example CO2, halogen, monoammonium phosphate—or contain flame-retarding additives. The liquid or gas exits through defined "burst regions" or burst openings in the event of a cell propagation and reduces or inhibits the resulting fire damage within the battery housing. The membrane can have different stiffness levels on its surface due to the ribbing and/or embossments. The propagation behavior can be further improved by "inserting" a further layer—primarily fabric board or fiberboard—between the two layers.

The invention claimed is:

1. A separating device for a battery module comprising:
a first separating element and a second separating element, which are arranged congruently with respect to one another and adjacent one another,
wherein the first separating element and the second separating element enclose a sealed chamber therebetween,
wherein the first separating element and the second separating element each have a plurality of channel-shaped embossments for forming the sealed chamber,
wherein the plurality of channel-shaped embossments of the first separating element each extend away from the second separating element, and the plurality of channel-shaped embossments of the second separating element each extend away from the first separating element,
wherein the plurality of channel-shaped embossments of the first separating element and of the second separating element are arranged opposite one another, and
wherein the sealed chamber is filled with a flame-retarding and/or insulating fluid.

2. The separating device according to claim 1, wherein the flame-retarding and/or insulating fluid is formed as a gas.

3. The separating device according to claim 1, wherein the separating device has a third separating element which is arranged between the first separating element and the second separating element, and
wherein the third separating element is formed as a fabric board or fiberboard.

4. The separating device according to claim 1, wherein the separating device has at least one burst opening through which the flame-retarding and/or insulating fluid can escape when a temperature and/or a pressure in the sealed chamber reaches a predetermined value.

5. The separating device according to claim 1, wherein the plurality of channel shaped embossments are arranged concentrically with respect to one another.

6. The separating device according to claim 1, wherein the first separating element and the second separating element each comprise a central embossment for forming the sealed chamber,
wherein the central embossment is concentric with respect to the plurality of channel-shaped embossments.

7. The separating device according to claim 1, wherein the first separating element and the second separating element are formed from a heat-conducting material.

8. A battery module comprising:
several battery cells and
at least one separating device, the at least one separating device comprising:
a first separating element and a second separating element, which are arranged congruently with respect to one another and adjacent one another,
wherein the first separating element and the second separating element enclose a sealed chamber therebetween,
wherein the first separating element and the second separating element each have a plurality of channel-shaped embossments for forming the sealed chamber,
wherein the plurality of channel-shaped embossments of the first separating element each extend away from the second separating element, and the plurality of channel-shaped embossments of the second separating element each extend away from the first separating element, wherein the plurality of channel-shaped embossments of the first separating element and of the second separating element are arranged opposite one another, wherein the sealed chamber is filled with a flame-retarding and/or insulating fluid, and wherein the at least one separating device is arranged between two adjacent battery cells.

9. The battery module according to claim 8, wherein the battery module further comprises a heat-dissipation device comprising at least one of a thermally conductive paste and a cooling element, wherein the battery cells and the at least one separating device are arranged on the heat-dissipation device in a vertical direction of the battery module.

10. A motor vehicle having the battery module according to claim 8.

11. The separating device according to claim 2, wherein the gas comprises at least one of carbon dioxide, halogen, and monoammonium phosphate.

12. The separating device according to claim 2, wherein the separating device has at least one burst opening through which the flame-retarding and/or insulating fluid can escape when a temperature and/or a pressure in the sealed chamber reaches a predetermined value.

13. The separating device according to claim 3, wherein the separating device has at least one burst opening through which the flame-retarding and/or insulating fluid can escape when a temperature and/or a pressure in the sealed chamber reaches a predetermined value.

14. The separating device according to claim 7, wherein the heat-conducting material is steel.

15. The separating device according to claim 1, wherein each of the plurality of channel-shaped embossments is formed to increase a stiffness of each of the first separating element and the second separating element.

16. The battery module according to claim 8, wherein each of the plurality of channel-shaped embossments is formed to increase a stiffness of each of the first separating element and the second separating element.

* * * * *